United States Patent [19]

Tamura

[11] Patent Number: 5,528,439
[45] Date of Patent: Jun. 18, 1996

[54] TAPE PLAYER HEAD WITH A WEAR-PREVENTING CAM ARRANGEMENT

[75] Inventor: Tamotsu Tamura, Oohtawara, Japan

[73] Assignee: Shinwa Kabushiki Kaisha, Tokyo, Japan

[21] Appl. No.: 324,063

[22] Filed: Oct. 17, 1994

Related U.S. Application Data

[63] Continuation of Ser. No. 42,117, Apr. 2, 1993, abandoned.

[30] Foreign Application Priority Data

Apr. 13, 1992 [JP] Japan .................................. 4-92552

[51] Int. Cl.⁶ ...................................................... G11B 5/55
[52] U.S. Cl. ........................................... 360/109; 360/106
[58] Field of Search ...................................... 360/109, 106, 360/129, 137

[56] References Cited

U.S. PATENT DOCUMENTS 4,510,543  4/1985  Ohta et al. ............................... 360/106
4,811,145  3/1989  Ogawa ...................................... 360/109

FOREIGN PATENT DOCUMENTS

61-180919  8/1986  Japan ....................................... 360/106

*Primary Examiner*—Stuart S. Levy
*Assistant Examiner*—Kevin M. Watkins
*Attorney, Agent, or Firm*—Christopher R. Pastel; Thomas R. Morrison

[57] ABSTRACT

A head device for a tape player has a head moving plate for bringing a head into contact with or pulling it away from a magnetic tape. The head is attached to a head holder. A forward azimuth adjusting screw and a reverse azimuth adjusting screw are adjustably screwed, in the vertical direction, through the head holder. A head driver moves the head holder up and down along the width of a magnetic tape. When the head driver is in motion, the azimuth adjusting screws are prevented from contacting a surface of the head device, thus reducing wear of the surface. Additionally, while the head driver is in motion, the head is set in a center position. When the head driver ceases motion, the azimuth adjusting screws contact a surface of the head device to adjust the azimuth and cause the head to be held at a height corresponding to the azimuth.

6 Claims, 5 Drawing Sheets

TAPE PLAYER HEAD WITH A WEAR-PREVENTING CAM ARRANGEMENT

This is a continuation of application Ser. No. 08/042,117 filed Apr. 2, 1993, now abandoned.

BACKGROUND OF THE INVENTION

The present invention relates to a head device for a tape player which moves the head up and down the width of a magnetic tape to switch tracks for reverse motion and forward motion.

An example of conventional head devices of this type which are used in tape players is described in Japanese Utility Model Publication Laid-Open No, 58315/1988. It discloses a head device having an automatic reverse function which allows movement up and down the width of a magnetic tape to switch tracks for reverse motion and forward motion. The disclosed conventional head device requires a head holder which is movable up and down the width of a magnetic tape and provided with forward and reverse azimuth adjusting screws. The azimuth adjusting screws are screwed vertically through the head holder. Additionally, the device disclosed in the prior art has a forward-mode supporting surface and a reverse-mode supporting surface for holding the head holder at either the reverse-mode position or the forward-mode position. The azimuth adjusting screws contact a head driver for moving the head holder up and down.

In a conventional tape player head device having the above structure, a contact/sliding movement is continuously repeated between the azimuth adjusting screws of the head holder and the supporting surfaces of the head driver, causing wear of the supporting surfaces. As a result, the height of the head changes, which consequently changes the azimuth, and produces inaccurate tracking of the head on the tape.

OBJECTS AND SUMMARY OF THE INVENTION

Accordingly, it is an object of the invention to provide a head device for a tape player which overcomes the drawbacks of the prior art.

It is a further object of this invention to provide a head device for a tape player which is capable of reducing wear of an azimuth receiving surface.

It is a still further object of this invention to provide a head device for a tape player which is capable of preventing changes in the azimuth after adjustments have been made, to ensure constancy of azimuth and prevent changes in the height of the head.

Briefly stated, a head device for a tape player according to the present invention has a head moving plate for bringing a head into contact with or pulling it away from a magnetic tape. The head is attached to a head holder. A forward azimuth adjusting screw and a reverse azimuth adjusting screw are adjustably screwed, in the vertical direction, through the head holder. A head driver moves the head holder up and down the width of a magnetic tape. When the head driver is in motion, the azimuth adjusting screws are prevented from contacting a surface of the head device to reduce wear of the surface. Additionally, while the head driver is in motion, the head is set in a center position. When the head driver ceases motion, the azimuth adjusting screws contact a surface of the head device to adjust the azimuth and cause the head to be held at a height corresponding to the azimuth.

According to an embodiment of this invention there is provided a head device for a tape player comprising: a head holder to hold a head; a head driver, slidably moveable in a lateral direction, for moving the head holder up and down a width of a magnetic tape; an azimuth adjusting screw; means for moving the azimuth adjusting screw away from a surface of the head device when the head driver is in motion; means for setting the head in a center position when the head driver is in motion; means for adjusting an azimuth; and means for holding the head at a height corresponding to the azimuth when the head driver stops moving.

According to a feature of this invention, there is provided a head device for a tape player comprising: a head moving plate for moving a head distal and proximate to a magnetic tape; a head holder, located adjacent to the head moving plate, to hold the head; a forward azimuth adjusting screw vertically piercing the head holder for moving the head holder in a vertical direction; a reverse azimuth adjusting screw vertically piercing the head holder for moving the head holder in a vertical direction; an azimuth receiving portion, on a surface of said head holder, contacted by the forward and reverse azimuth adjusting screws; a head driver, slidably moveable in a lateral direction on the head moving plate, for moving the head holder up and down a width of a magnetic tape; a first cam portion for vertically moving the head holder on the head holder; a cam receiving portion facing the first cam portion; the first cam portion being slidable laterally on the cam receiving portion to move the head holder upward and move the first and second azimuth adjusting screws away from the azimuth receiving surface; a second cam portion for holding the head in a center position on the head holder; a cam receiving surface facing the second cam portion; the second cam portion contacts the cam receiving surface to set a height of the head at a center position; and means for concluding sliding movement of the head driver when the azimuth receiving portion is contacted by the forward and reverse azimuth adjusting screws, thereby adjusting an azimuth and causing the head to be held at a height corresponding to the azimuth.

The above, and other objects, features and advantages of the present invention will become apparent from the detailed description read in conjunction with the accompanying drawings, in which like reference numerals designate the same element.

DETAILED DESCRIPTION OF PREFERRED EMBODIMENTS

The head holder is located above the head moving plate and is vertically movable. The forward and reverse azimuth adjusting screws are capable of abutting against azimuth receiving portions formed on a surface facing the head holder. The head driver is able to slide in the lateral direction on the head moving plate. A cam portion for holding the head in a center position is formed at the head holder, the head guide, or the head driver. A cam receiving surface is formed on the surface facing the cam portion for holding the head in a center position. A cam portion for vertically moving the head holder is formed at either the head holder or the head driver. A cam receiving surface, on which a cam portion for vertically moving the head holder slides, faces this cam portion for vertically moving the head holder.

During lateral sliding movement of the head driver, the azimuth adjusting screws are moved away from the azimuth receiving surfaces by sliding contact of the cam portion for vertically moving the head holder and its corresponding cam receiving surface. When the sliding head driver reaches an end, either the forward azimuth adjusting screw or the reverse azimuth adjusting screw abuts the forward azimuth receiving surface or the reverse azimuth receiving surface, to adjust the azimuth.

In a head device for a tape player according to the present invention, when the head driver slides in the lateral direction at the time of switching between forward-play and reverse-play, the head holder is moved up or down. On the head holder the head is moved parallel to the width of the magnetic tape and positioned to the track for the appropriate forward-play or reverse-play function. Either the forward azimuth adjusting screw or the reverse azimuth adjusting screw contacts the forward azimuth receiving surface or the reverse azimuth receiving surface, and the head is held at the height corresponding to the azimuth for forward or reverse play by the corresponding azimuth adjusting screw which is adjusted beforehand. Then, when the head driver is caused to slide, the cam receiving portions of the head holder contact the cam portions of the head driver, thereby moving the head holder upward. As a result, the azimuth adjusting screws are removed from their respective azimuth receiving surfaces. Accordingly, wear of the azimuth receiving surfaces, caused by sliding friction, is reduced.

As the head driver slides further, the cam portions move across the cam receiving portions, thereby causing the head holder to move downward and the reverse azimuth adjusting screw or the forward azimuth adjusting screw to contact its corresponding azimuth receiving surface. As a result, the head is held at the height corresponding to the azimuth for the forward or the reverse play by the corresponding azimuth adjusting screw, which is adjusted beforehand.

Furthermore, the height of the head at its center position is set at the forward-play position or the reverse-play position by the cam portion for holding the center position of the head. As the head driver moves, the cam portion for holding the center position of the head is removed from the cam receiving surface, reducing wear of the surface caused by sliding friction. As the head driver slides, the cam portion for holding the center position of the head comes to contact with the corresponding cam receiving surface, thereby setting the height of the head at its center position.

Figure 1:
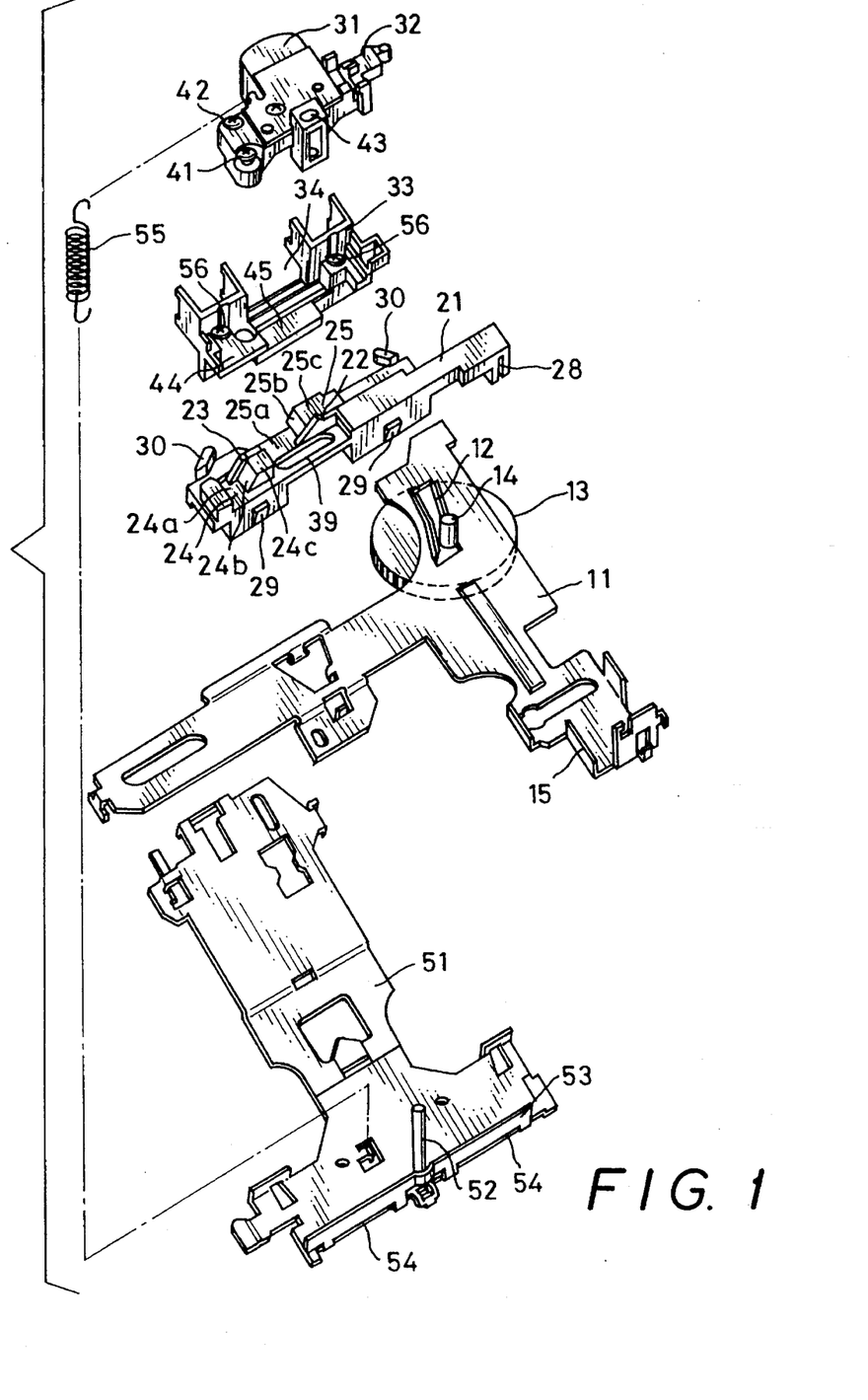
FIG. 1 is an exploded oblique view of a tape player head device according to an embodiment of the present invention.

Referring to FIG. 1, a metallic switching plate 11 is attached to a base plate (not shown) to slide in the lateral direction. An eccentric operation stud 14 engages an engagement slot 12, which is disposed at a right angle to the sliding direction of switching plate 11. Eccentric operation stud 14 protrudes from a change-direction drive gear 13 rotated by a tape-end detection mechanism (not shown). Eccentric operation stud 14 is located away from a tube rotation center of change-direction drive gear 13. As a result, switching plate 11 slides in the lateral direction, which corresponds to a rotation angle of change-direction drive gear 13.

A catching lip 15, long in the fore and aft direction, is located near an end of switching plate 11. Catching lip 15 is formed by bending a part of switching plate 11 upward.

A head driver 21, made of a synthetic resin, is slidable in the lateral direction. A first cam portion 22 and a second cam portion 23, both for vertically moving a head holder 32, are located at the top of head driver 21. Cam portions 22 and 23 protrude upward with an inclined surface on both sides in the lateral direction. Cam portions 22 and 23 are spaced apart in the lateral direction and are located on different lateral axes. A reverse azimuth receiving surface 24 is adjacent to second cam portion 23. A cam receiving surface 25 is adjacent to first cam portion 22. Reverse azimuth receiving surface 24 has a bottom 24a and a raised portion 24c. An inclined portion 24b is disposed between bottom 24a and raised portion 24c. Cam receiving surface 25 has a bottom 25a and a raised portion 25c. An inclined portion 25b is disposed between bottom 25a and raised portion 25c. Reverse azimuth receiving surface 24 and cam receiving surface 25 are spaced apart in the lateral direction and are on different lateral axes.

At an end of head driver 21, opposite both cam portions, is a catching groove 28 for catching engagement lip 15 of switching plate 11. Catching groove 28 is long in the fore and aft direction and opens downward. When engagement lip 15, of switching plate 11, is engaged in catching groove 28, head driver 21 is able to slide in the lateral direction together with switching plate 11.

Head driver 21 also has engagement guiding nubs 29, protruding from a front of head driver 21, and slide restricting nubs 30, at both ends of a top of head driver 21.

A head 31 is supported by and fitted within vertically movable head holder 32, which is made of synthetic resin. Head holder 32 is attached to a fitting cavity 34 at a center of a head guide 33, which is made of synthetic resin. Slide restricting nubs 30, of head driver 21, are in contact with both ends of head guide 33 to restrict the range of lateral movement of head driver 21.

Figure 2:
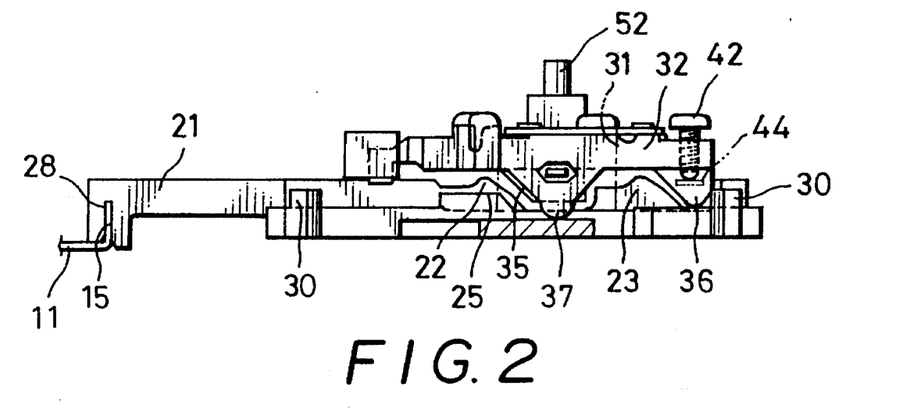
FIG. 2 is a rear view of the tape player head device of FIG. 1 in the forward-play mode.

Referring to FIG. 2, a first cam receiving portion 35, a second cam receiving portion 36, and a third cam portion 37 are located on an underside of head holder 32. First cam receiving portion 35 and second cam receiving portion 36 are spaced apart in the lateral direction and are on different lateral axes. Third cam portion 37 is located in front of a center of head 31, between first cam receiving portion 35 and second cam receiving portion 36, and close to, but not on the same lateral axis as, first cam receiving portion 35. First cam receiving portion 35 is formed on a surface facing first cam portion 22 to allow first cam portion 22 to slide thereon. Second cam receiving portion 36 is formed on a surface facing second cam portion 23 to allow second cam portion 23 to slide thereon. Third cam portion 37 is positioned to Slide on cam receiving surface 25.

Referring again to FIG. 1, a reverse azimuth adjusting screw 41 abuts reverse azimuth receiving surface 24. A forward azimuth adjusting screw 42 abuts cam receiving surface 25. Reverse azimuth adjusting screw 41 and forward azimuth adjusting screw 42 are arranged in the fore and aft direction at an end of head holder 32. Reverse azimuth adjusting screw 41 and forward azimuth adjusting screw 42 are threaded through head holder 32 such that the vertical positions of their ends can be adjusted.

A metal head moving plate 51, supported by a base plate (not shown), is movable in the fore and aft direction. Head guide 33 is fixed to head moving plate 51, and head driver 21 is supported between head guide 33 and head moving plate 51, to slide in the lateral direction. Forward azimuth receiving surface 44 and a cam receiving surface 45 are formed on head guide 33. Cam receiving surface 45 is located adjacent to forward azimuth receiving surface 44 and above bottom 25a of cam receiving surface 25 of head driver 21.

Switching of a play mechanism or a fast-forward mechanism (not shown) advances or retreats head moving plate 51 causing head 31 to contact or move away from a magnetic tape (not shown).

Head moving plate 51 has a guide stud 52 which projects from head moving plate 51 and is inserted in a guide hole 43 bored in head holder 32.

Head moving plate 51 has a guiding edge 53. Guiding edge 53 is formed by cutting a part of an end of head moving plate 51 and bending the cut part upward. Guide holes 54, for engaging engagement guiding nubs 29 of head driver 21, are bored through head moving plate 51. Guide holes 54 are aligned and elongated in the lateral direction.

Head guide 33 faces guiding edge 53 where it is fixed to head moving plate 51 with screws 56. Head driver 21 is positioned between guiding edge 53 and head guide 33. Head driver 21 is supported by engaging engagement guiding nubs 29 in guide holes 54. Additionally, a lower surface of forward azimuth receiving surface 44, of head guide 33, and head moving plate 51 sandwich head driver 21, such that head driver 21 is able to slide, in the lateral direction, on an upper surface of head moving plate 51.

Head holder 32 is held by head guide 33 to permit it to be moved upward and downward by guide stud 52 inserted through guide hole 43 of head holder 32 and by a laterally elongated hole 39 formed in head driver 21. Head holder 32 is constantly urged toward head moving plate 51 by a coil spring 55.

The operations of the tape player head device, according to the present invention, are explained with reference to the figures.

Figure 3:
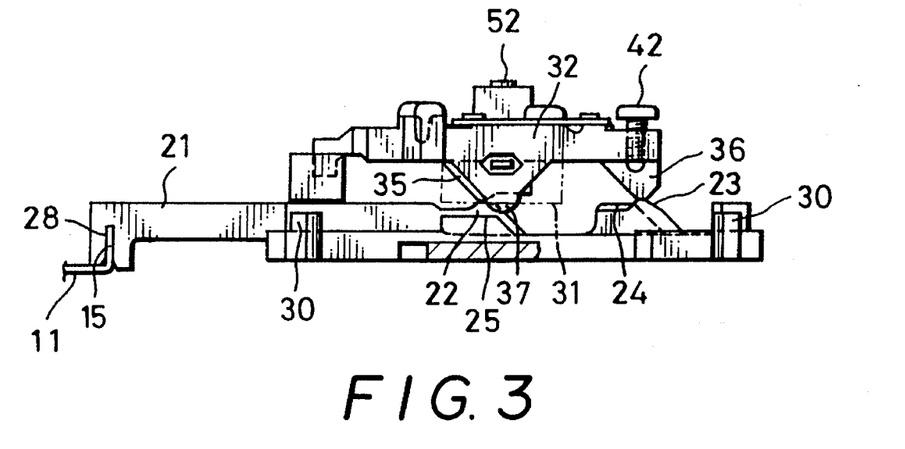
FIG. 3 is a rear view of the tape player head device of FIG. 1 at the stage halfway between the forward-play mode and the reverse-play mode.
Figure 4:
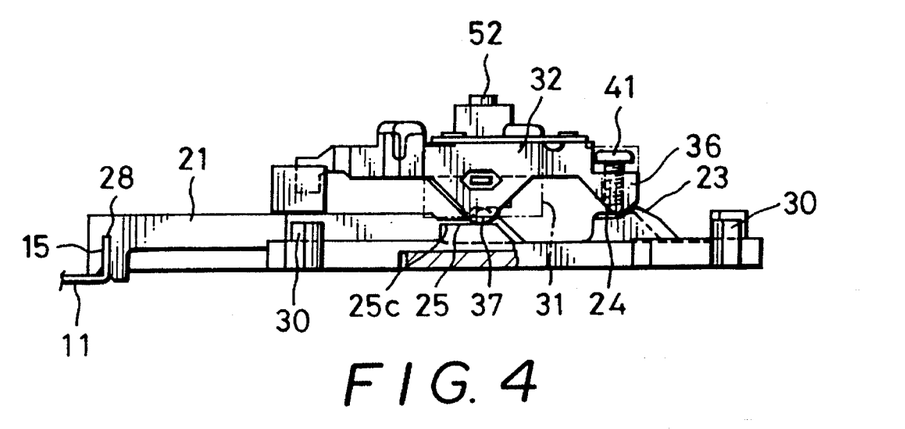
FIG. 4 is a rear view of the tape player head device of FIG. 1 in the reverse-play mode.
Figure 5:
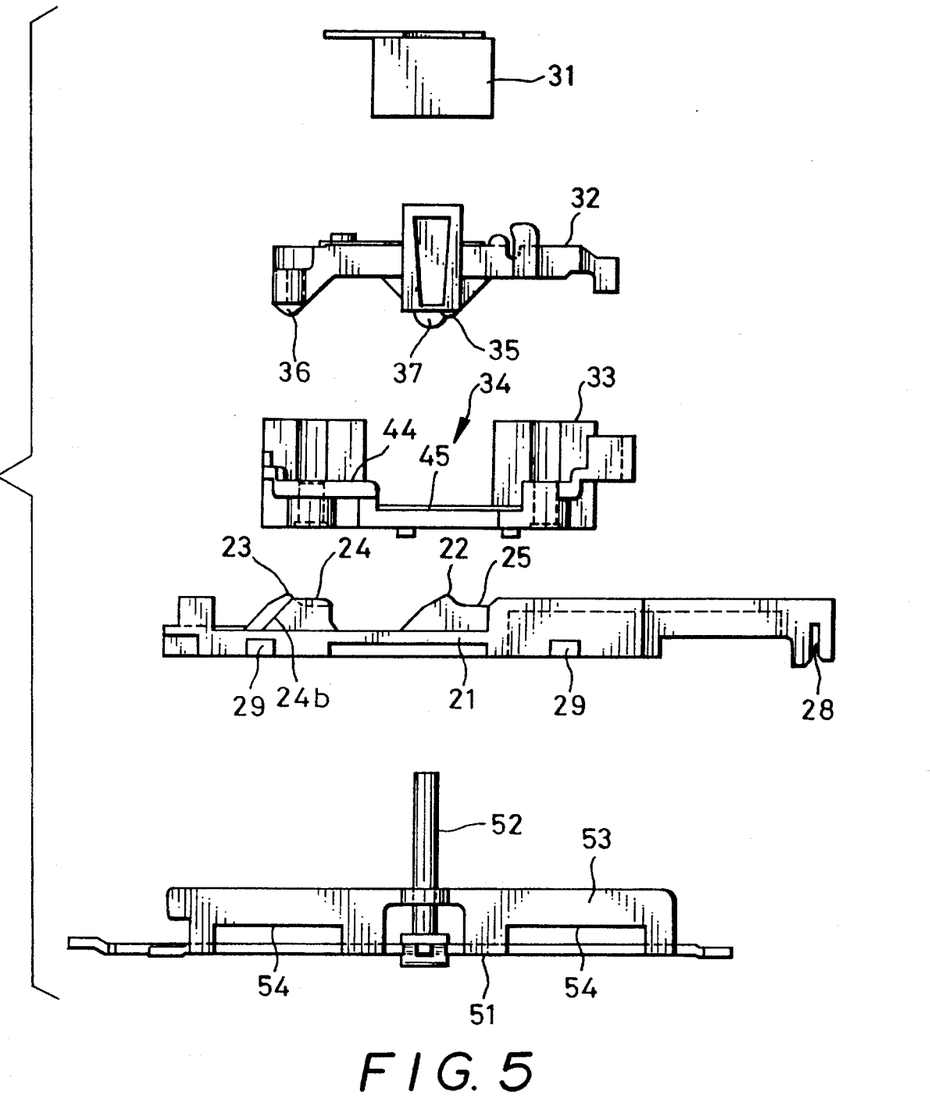
FIG. 5 is an exploded front view of the tape player head device of FIG. 1.
Figure 6:
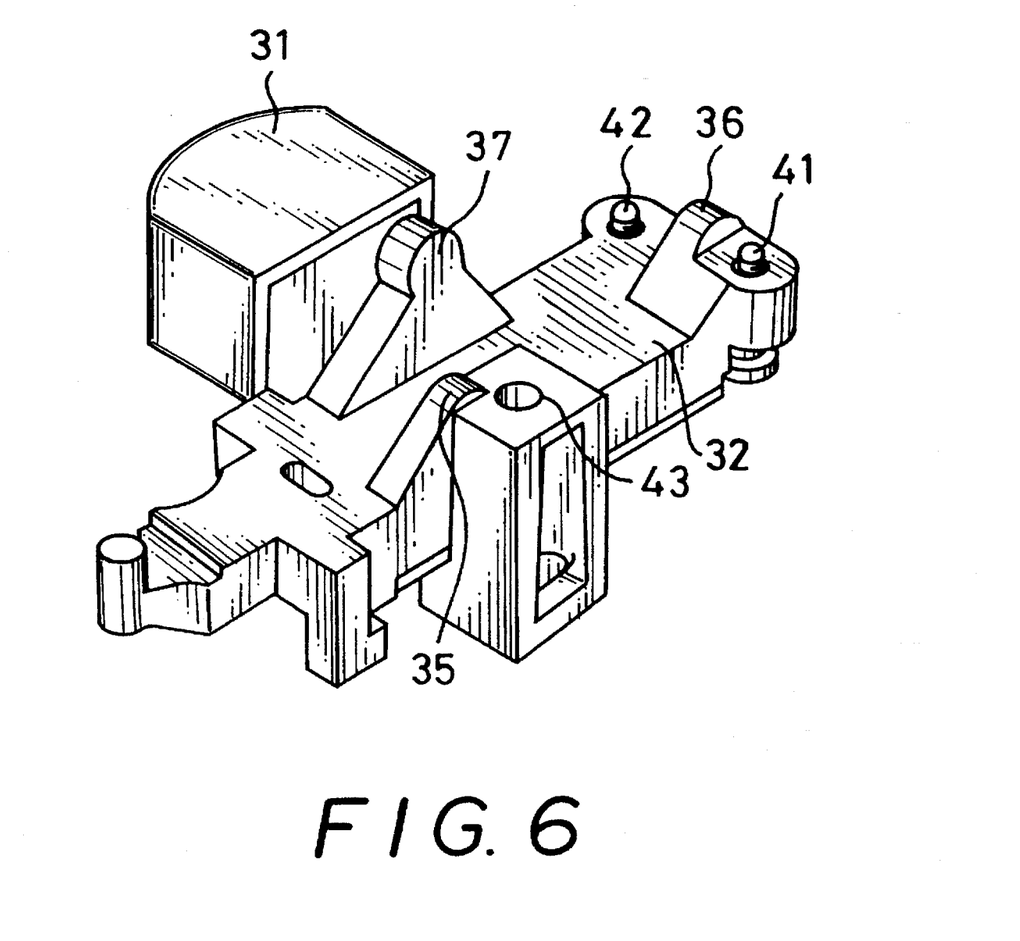
FIG. 6 is an oblique view of the bottom of the head holder of the tape player head device of FIG. 1.
Figure 7:
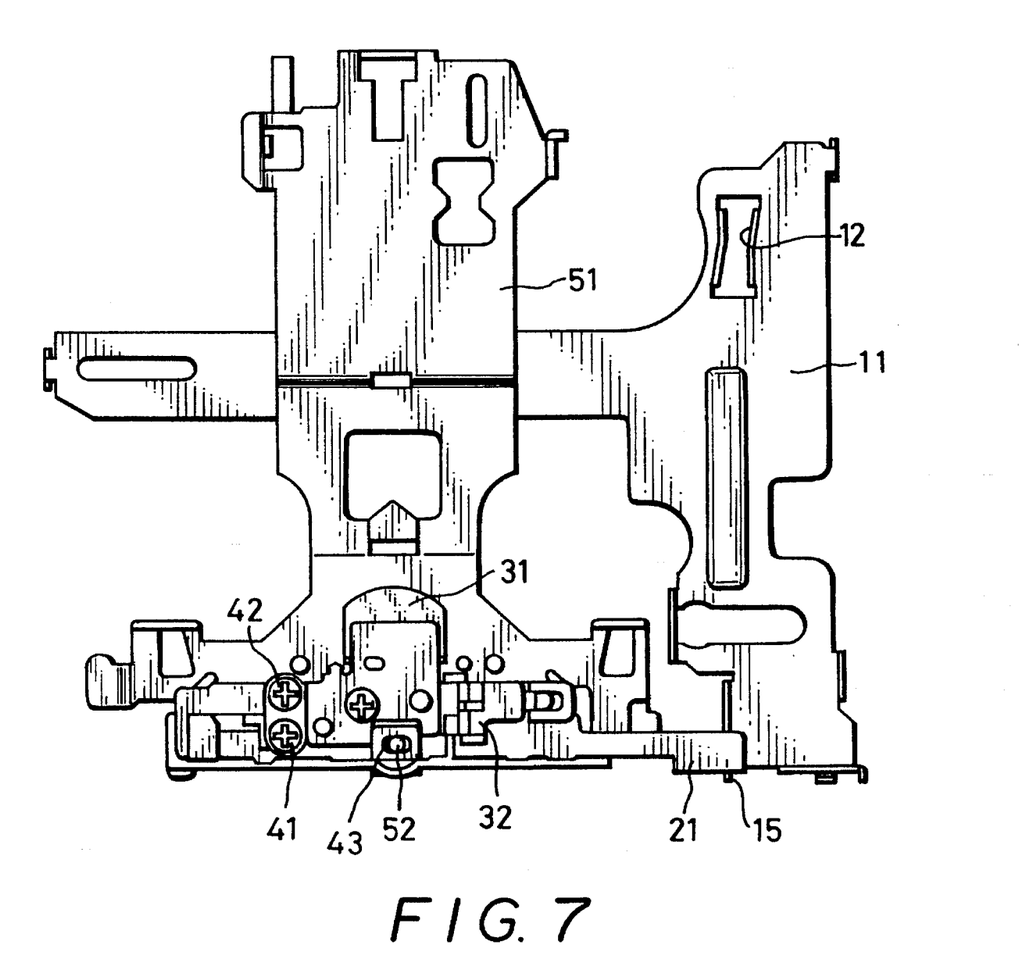
FIG. 7 is a plan view of the tape player head device of FIG. 1.

With reference to FIGS. 1 through 4, when the tape end detecting mechanism (not shown) detects the end of a magnetic tape (not shown) during reverse play mode, the change-direction drive gear 13 is rotated, causing switching plate 11, which engages the eccentric operation stud 14 of change-direction drive gear 13 in engagement slot 12, to slide so that head driver 21, engaging switching plate 11, slides to the right from the position shown in FIG. 4.

Under the condition shown in. FIG. 4, third cam portion 37, for securing the center position of head 31 of head holder 32, is in contact with raised portion 25c of cam receiving surface 25. Reverse azimuth adjusting screw 41 is in contact with reverse azimuth receiving surface 24, so that the height of head 31 is kept constant by the preadjusted reverse azimuth adjusting screw 41 at the azimuth adjusting position for the reverse-play mode.

When head driver 21 slides, first cam receiving portion 35 and second cam receiving portion 36 respectively contact first cam portion 22 and second cam portion 23, as shown in FIG. 3. As a result, head holder 32 moves upward, against the force of coil spring 55 to cause cam portion 31 and azimuth adjusting screws 41 and 42 to separate from raised portion 25c of cam receiving surface 25 and azimuth receiving surfaces 24 and 44 respectively.

As head driver 21 slides further, the tops of the first and second cam portions 22 and 23 respectively move across the first and second cam receiving portions 35 and 36, permitting lowering of head holder 32 by spring 55. As a result, third cam portion 37, for securing the center position of head 31 of head holder 32, contacts cam receiving surface 45 of head guide 33, located above bottom 25a of cam receiving surface 25. Additionally, forward azimuth adjusting screw 42 contacts forward azimuth receiving surface 44 of head guide 33, whereupon the first and second cam receiving portions 35 and 36 are lifted. In that state, head 31 is held at the azimuth adjusting height for the forward-play mode by the preadjusted forward azimuth adjusting screw 42.

When the tape end detecting mechanism (not shown) detects the end of a magnetic tape (not shown) during the forward play mode as shown in FIG. 2, the change-direction drive gear 13 is rotated, causing switching plate 11, which engages eccentric operation stud 14 of the change-direction drive gear 13 in the engagement slot 12, to slide so that head driver 21, engaging switching plate 11, slides from the position shown in FIG. 2 to the right. Then, through action in reverse to the above, head 31 is set at the reverse-play position. Although azimuth receiving surfaces 24 and 44 are formed at head driver 21 and head guide 33 in the present embodiment as explained thus far, an azimuth receiving surface may be formed only at head driver 21 or only at head guide 33 without departing from the scope or spirit of the invention as defined in the appended claims.

To ensure stable operation, two cam portions and two cam receiving portions, for example cam portions 22 and 23 and first and second cam receiving portions 35 and 36, are respectively formed on head driver 21 and head holder 32. However, first cam receiving portion 35 may be omitted, allowing cam portion 37, for securing the center position of head 31, to perform the function of first cam receiving portion 35.

Furthermore, cam portions 22 and 23 for vertically moving head holder 32 may be formed at head guide 33 or head holder 32, instead of at head driver 21 as in the present embodiment. Additionally, cam receiving portions 35 and 36 may be formed at head driver 21.

In the above embodiment, cam portion 31, for holding the center position of head 31, is formed at head holder 32 so that cam portion 37 slides on cam receiving surface 25 of head driver 21 and abuts raised portion 25c of cam receiving surface 25 and cam receiving surface 45 of head guide 33, thereby holding the center position of head 31. However, cam portion 37 may be provided at any one of head driver 21, head guide 33 or head moving plate 51. It is also possible to form a cam portion 37, which holds the center position of head 31, at head driver 21 and a cam receiving surface at head holder 32.

According to the present invention, a cam portion, for causing a head driver to vertically move a head holder, which holds a head, is formed at the head driver so that azimuth adjusting screws are separated from azimuth receiving surfaces without sliding thereon. By preventing the azimuth receiving surfaces from sliding against the azimuth adjusting screws all the time, the present invention reduces wear of the azimuth receiving surfaces.

Additionally, since the center position of the head is secured by a cam portion, the present invention is capable of preventing changes in azimuth after adjustments have been made, thereby ensuring constancy of azimuth and preventing the height of a head from changing.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A head device for a tape player, comprising:

a head;

a support for holding said head;

a frame;

said support including a first rest;

means for shifting said support, relative to said frame, between a first and a second position;

means for establishing a first azimuth of said head when said support is in said first position;

said means for establishing said first azimuth including means for resting said first rest against a first surface connected to said frame;

a second rest connected to said support;

means for establishing a second azimuth of said head when said support is in said second position;

said means for establishing said second azimuth including means for resting said second rest against a second surface connected to said frame;

means for vertically lifting said first rest away from said first surface while said support is being shifted, whereby a vertical distance between said first surface and said support is increased during at least part of said shifting and rubbing of said first rest against said first surface is mitigated;

said means for vertically lifting also lifting said second rest away from said second surface while said support is being shifted, whereby a vertical distance between said second surface and said support is increased during at least part of said shifting and rubbing of said second rest against said second surface is mitigated;

said means for vertically lifting said first rest includes a first cam on said support; and said means for vertically lifting said second rest includes a second cam on said support.

2. Apparatus as in claim 1, wherein said first rest is an end of a screw rotatably connected to said support.

3. A head device for a tape player comprising:

a head;

a head moving plate for moving said head toward and away from a tape;

a head driver having first and second receiving surfaces thereon;

a head holder for supporting said head;

means for translating said head holder between a first position and a second position;

a first adjustable extension element connected to said head holder;

a second adjustable extension element connected to said head holder;

said first adjustable extension element having a first end whose position, in a direction perpendicular to said tape, is adjustable for adjusting a first azimuth of said head when said head holder is in said first position;

said second adjustable extension element having a second end whose position, in a direction perpendicular to said tape, is adjustable for adjusting a second azimuth of said head when said head holder is in said second position;

means for holding said first end in contact with said first receiving surface of said head driver when said head holder is in said first position, and for holding said second end in contact with said second receiving surface of said head driver when said head holder is in said second position, whereby said head holder is azimuthally positioned relative to said head driver;

means for vertically lifting said first end away from said first receiving surface, in opposition to said first means for holding, when said head holder is translated from said first position, whereby a vertical distance between said first receiving surface and said first end is increased during at least part of said translating and rubbing of said first end against said first receiving surface is mitigated;

said means for vertically lifting also lifting said second end away from said second receiving surface, in opposition to said second means for holding, when said head holder is translated from said second position, whereby a vertical distance between said second receiving surface and said second end is increased during at least part of said translating and rubbing of said second end against said second receiving surface is mitigated;

said means for vertically lifting said first rest includes a first cam on said support;

said means for vertically lifting said second rest includes a second cam on said support;

means for allowing said first end to be held in contact with said first receiving surface when said head holder is translated to said first position; and means for allowing said second end to be held in contact with said second receiving surface when said head holder is translated to said second position.

4. Apparatus as in claim 3, wherein said first extension element is a screw.

5. A head device for a tape player, comprising:

a head;

a support for holding said head;

a frame;

one of said support and said frame including a first adjustable rest;

one of said support and said frame including a second adjustable rest;

means for shifting said support, relative to said frame, between a first and a second position;

first means for establishing a first azimuth of said head when said support is in said first position;

second means for establishing a second azimuth of said head when said support is in said second position;

said first means for establishing including means for resting said first rest against a first surface connected to another of said support and said frame;

said second means for establishing including means for resting said second rest against a second surface connected to another of said support and said frame;

means for vertically lifting said first rest away from said first surface while said support is being shifted relative to said frame, whereby a vertical distance between said rest and said first surface is increased during at least part of said shifting and rubbing of said first against said first surface is mitigated; and said means for vertically lifting also lifting said second rest away from said second surface while said support is being shifted relative to said frame, whereby a vertical distance between said second rest and said second surface is increased at least during part of said shifting and rubbing of said second rest against said second surface is mitigated;

said means for vertically lifting said first rest includes a first cam on said support; and said means for vertically lifting said second rest includes a second cam on said support.

6. A tape player head device, comprising:

a head;

a head moving plate for alternately bringing said head into contact with a magnetic tape and pulling said head away from said magnetic tape;

a guide shaft on said head moving plate;

a head guide having a guide hole therein for receiving said guide shaft, whereby said head guide is vertically movably connected to said head moving plate;

a head holder connected to said head guide so as to be vertically movable;

means for biasing said head holder against said head moving plate;

said head being connected to said head holder;

said head holder having first and second cam receiving portions;

said head holder having a forward azimuth adjusting screw adjustably screwable vertically;

said head holder having a reverse azimuth adjusting screw adjustably screwable vertically;

a head driver slidably attached to said head moving plate;

forward and reverse azimuth receiving surfaces on said head driver;

said forward azimuth receiving surface intermittently contacting said forward azimuth adjusting screw and said reverse azimuth receiving surface intermittently contacting said reverse azimuth adjusting screw, whereby said head driver moves said head up and down a width of said magnetic tape;

first and second cam portions on said head driver;

a third cam portion on said head holder for holding a center position of said head;

said first cam portion on said head driver abutting said first cam receiving portion on said head holder;

said second cam portion on said head driver abutting said second cam receiving portion on said head holder;

said first and second cam portions being arranged on said head driver so that, during lateral sliding movement of said head driver, said forward and reverse azimuth adjusting screws are separated from said forward and reverse azimuth receiving surfaces, respectively, by means of sliding contact of either said first cam portion or said second cam portion contacting said first cam receiving portion or said second cam receiving portion respectively; and when said head driver reaches an end of said lateral sliding movement, either said forward azimuth adjusting screw abuts said forward azimuth receiving surface, or said reverse azimuth adjusting screw abuts against said reverse azimuth receiving surface.

* * * * *